June 22, 1965 M. W. WOLFE 3,190,338
REPAIRED TIRE AND MAKING SAME
Filed Oct. 15, 1962 2 Sheets-Sheet 1
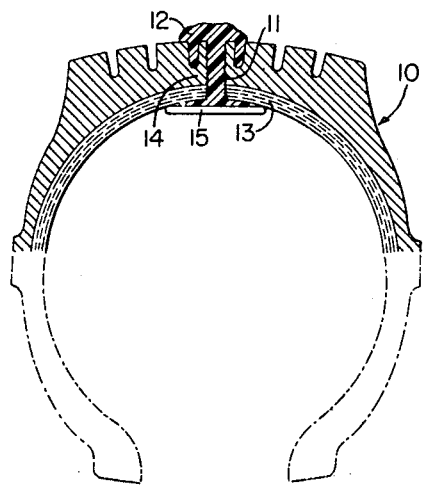
FIG. 1
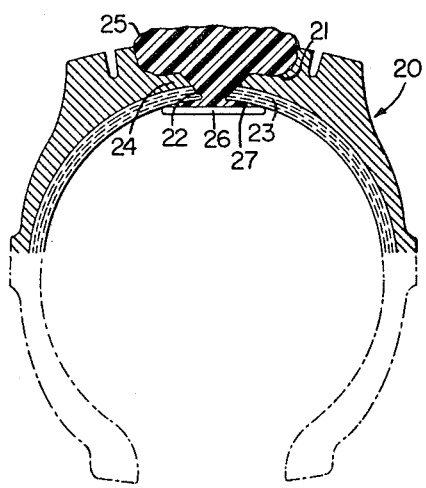
FIG. 2
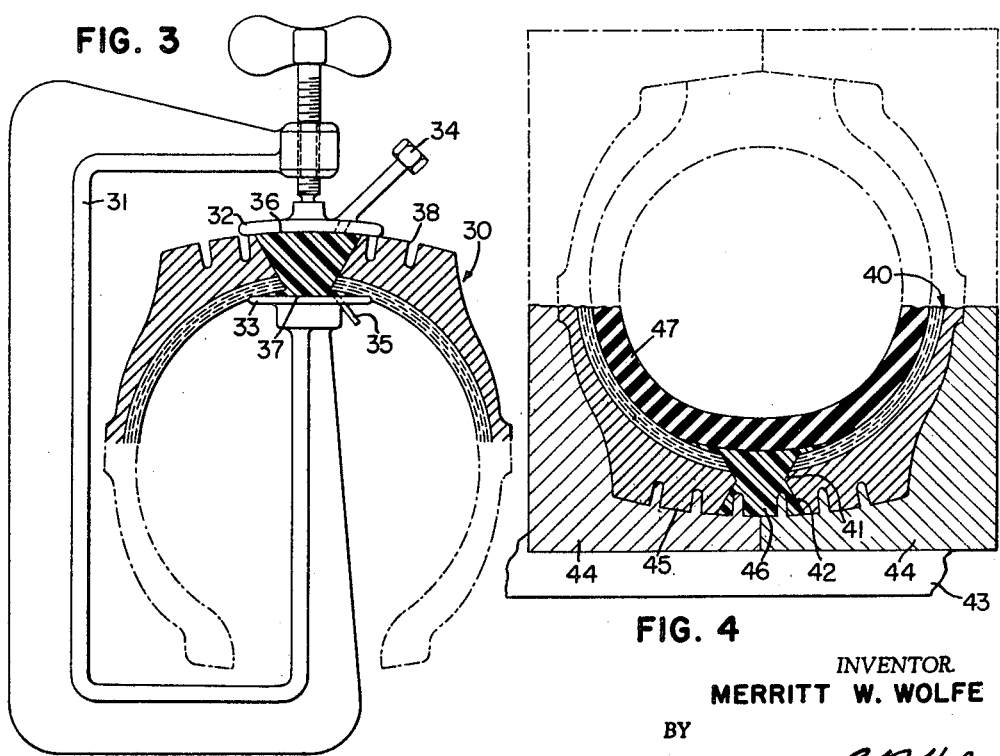
FIG. 3
FIG. 4
INVENTOR.
MERRITT W. WOLFE
BY
*J.B.Holden*
ATTORNEY June 22, 1965  M. W. WOLFE  3,190,338
REPAIRED TIRE AND MAKING SAME
Filed Oct. 15, 1962  2 Sheets-Sheet 2

INVENTOR.
MERRITT W. WOLFE
BY
J.B. Holden
ATTORNEY 3,190,338
REPAIRED TIRE AND MAKING SAME
Merritt W. Wolfe, Akron, Ohio, assignor to The Goodyear Tire & Rubber Company, Akron, Ohio, a corporation of Ohio
Filed Oct. 15, 1962, Ser. No. 230,573
4 Claims. (Cl. 152—370)

This invention relates to a new method of repairing a ruptured tire. In particular it relates to the method of pouring a tire repair from a liquid castable polyurethane composition.

Heretofore, the primary method of repairing a ruptured tire has been to adhere a patch over the break and to transmit the load carried by the tire cords into the patch reinforcement, then back again into the tire structure. In addition, the tire with a large hole quite often required the use of vulcanization equipment which was available only at a repair station specializing in that particular type of repair. Then, too, it has been common practice in the past to skive or cut the area around the break or rupture to that a minimum amount of cord area was exposed for bonding since the strength of the repair depended upon a rubber-to-rubber bond rather than a rubber-to-fabric bond. In developing a pourable repair several difficulties had to be overcome. First, a material had to be used that would permit the repair to be made with ease. Second, the repair material had to possess the toughness and resiliency of the parent tire material. And, third, the selected material had to be adherable to both rubber compounds and cord reinforcement as found within the tire carcass. The particular material employed in this invention had to possess, in addition to its outstanding physical properties, improved resistance to softening and deformation at elevated temperatures.

The principal object of the present invention is to provide an improved tire repair patch which may be poured in place. Another object of this invention is to provide a pourable tire repair that will cure at relatively low temperatures and the ingredients of which are sufficiently stable in the liquid state to permit adequate mixing of the ingredients and sufficient time for pouring the liquid mixture into a tire repair area. A further object is to provide a tire repair patch that will adhere to the reinforcement cord within the tire as well as the rubber throughout the tire carcass. Other objects of the invention will become apparent in the course of the following description and the drawings in which:

FIG. 1 is a sectional view of a tire repair employing a poured repair in a cylindrical hole;

FIG. 2 is a sectional view of a tire repair wherein the carcass is skived adjacent the hole;

FIG. 3 shows a repair section in which a clamp is employed to contain the casting;

FIG. 4 shows a tire repair cured in a sectional mold;

Figure 5:
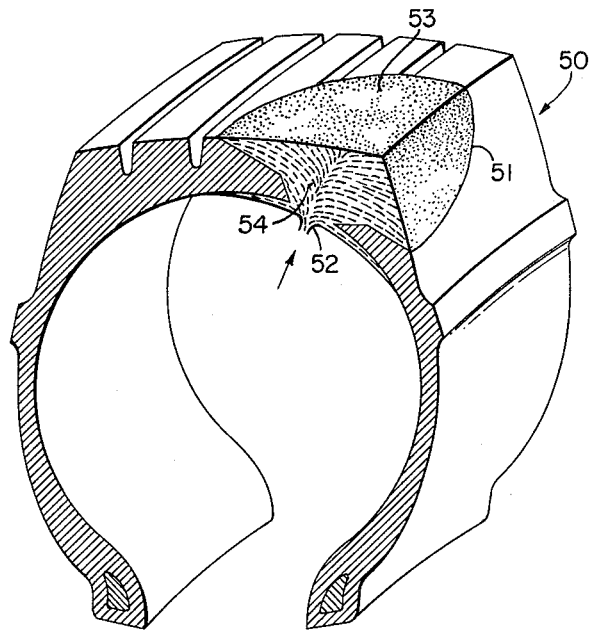
FIG. 5 shows a repair patch in which a filament reinforcement material is dispersed.

With reference to the drawings, FIG. 1 shows a tire carcass 10 that has been punctured. The hole 11 has been enlarged in diameter to accommodate the poured polyurethane repair material 12. The polyurethane is adhered to the tire reinforcement cord 13 and the surrounding rubber 14. A backup plate 15 is utilized to contain the liquid polyurethane mixture within the repair area. The backup plate can be any convenient material such as metal, wood, or even tape.

FIG. 2 shows a repair similar to FIG. 1 except that the tire carcass 20 has been skived or cut in a tapered frusto-conical shape 21 surrounding the hole. This procedure exposes more cord surface 22 thus permitting the polyurethane to better grasp the ends of cords 23. The area through the rubber stock 24 is also greatly increased, thus enhancing the bonding between the polyurethane repair 25 and the tire carcass. A backup plate 26 is shown on the inside of the tire carcass 20. By allowing the backup plate 26 to remain slightly away from the hole, a return flange or key 27 is formed on the interior, thus providing a mechanical lock to resist radial thrust of the repair plug when the tire is rotating. Then, too, flange 27 insures that the innermost reinforcement cords 23 are securely locked against chafing from a tube.

FIG. 3 depicts a tire carcass 30 in section along with a typical clamp 31 that is provided with pressure plates 32 and 33. A fluid inlet 34 is incorporated in plate 32 and a vent 35 is included in plate 33. The utilization of a clamp arrangement allows the desired top surface 36 and bottom surface 37 to be formed at one time. Since surface 36 is flush with the undamaged tread 38 no postmold cutting or trimming is necessary. Another advantage of an enclosed repair cavity is that the pourable polyurethane can be injected into the area surrounding the cord ends, thus causing a complete saturation with all the fibers to insure an interlock between the patch and the reinforcement cords.

FIG. 4 shows a tire 40 with two frusto-conical skived areas 41 and 42 in the vicinity of the rupture. The tire is placed in a sectional mold 43 containing sections 44 which provide a means of reproducing the tread design 45 in the polyurethane patch 46. An air bag 47 is employed to apply pressure and to form a contoured inner surface 48. The assembly as shown in FIG. 4 can be heat cured in order to minimize the time required for repair. The application of heat is optional since the polyurethane formulation will set up without additional heat.

FIG. 5 shows a tire 50 in which a repair patch 51 has been poured through an injection inlet located at 52. Contained within the polyurethane repair material 53 are flocked filaments 54 which have a tendency to orientate themselves so that they are longitudinally aligned with the directions of flow. The filaments can be any suitable material such as rayon or nylon. The reinforcement filaments within the polyurethane patch are predominantly aligned in the direction of greatest stress, therefore help to transmit the cord load from one side of the patch to the opposite side.

Figure 6:
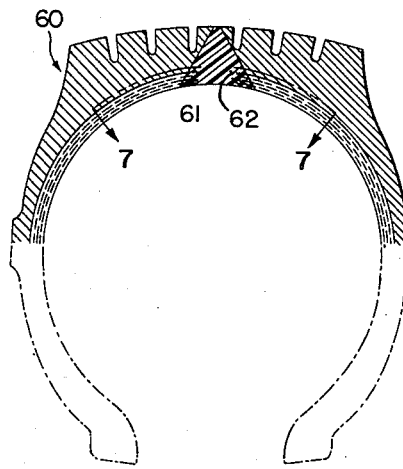
FIG. 6 shows a repair patch having a reverse taper on the walls of the skived repair area.

FIG. 6 sets forth a tire 60 that has the repair hole skived in such a manner that the largest opening 61 is at the inside of the tire. This manner of preparing the injured area permits a maximum cord area and a minimum rubber area for bonding of the polyurethane repair plug. This method of preparing the damaged area disrupts the least amount of tread material and also permits the ruptured cords 62 to be exposed in order that they may be bonded into the polyurethane repair material. As shown in FIG. 6 a small backup plate or material is required; however, in many instances the cavity need not pass through the tread rubber. When a tire is subjected to the impact of a blunt object the cords sometimes break without damaging the adjacent rubber. The repair is made by cutting or skiving a shallow cavity in the damaged area. The intact tread rubber served as a backup structure, thus containing the poured-in-place polyurethane.

Figure 7:
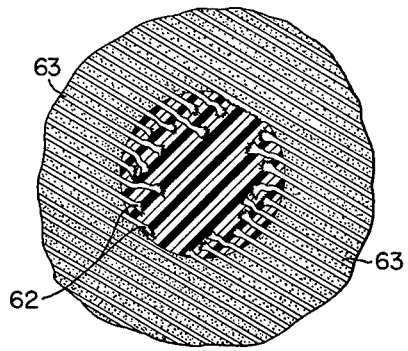
FIG. 7 is a section taken along line 7—7 of FIG. 6 which shows a single layer of cord reinforcement.

FIG. 7 shows how each cord end 62 is bared so that it may be firmly encapsulated by the repair patch. This is in marked contrast to prior repair methods wherein the cord ends were trimmed as short as possible so that the exposed cross section was reduced to a minimum. FIG. 7 also shows how an individual cord such as 63 can once again carry a tension load.

A typical polyurethane formulation for use in pourable repairs may be made by forming a liquid or a liquifiable reaction mixture comprising a reactive hydrogen containing polymeric material such as the polyetherpolyols, polyesterpolyols and polyesteramides of about 700 to 3500 molecular weight and about 1.1 and preferably 1.3 to more than 2 moles of an organo polyisocyanate for each mol of reactive hydrogen-containing polymeric material and a sufficient amount of a crosslinking agent selected from the class consisting of the diamines, the glycols and the amine alcohols polyols or combination of each to react with the excess of organo polyisocyanate and then pouring the liquid reaction mixture into the prepared rupture area of the tire carcass where it can be cured to give a repair element of the desired configuration.

The polyesters used in the practice of this invention are those conventionally prepared by the condensation reaction between one or more dicarboxylic acids and one or more glycols. Representive examples of the dicarboxylic acids which may be used in preparing these polyesters are: succinic, glutaric, adipic, pimelic, suberic, azelaic and sebacic. Of these acids, adipic, glutaric, and sebacic are particularly preferred. Representative examples of the glycols which may be used to prepare the polyesters are ethylene glycol, propylene glycol, butylene glycol, pentamethylene glycol and hexamethylene glycol. Of these, ethylene glycol, propylene glycol and mixtures of these two glycols are particularly preferred.

As indicated above, the polyester should preferably have an average molecular weight of from 1500 to 2500 and a corresponding hydroxyl number of from 45 to 75 with an acid number not greater than 5. The molecular weight range indicated defines the polyesters which are of the proper consistency for pouring in the liquid state either at room temperature or at relatively low temperatures, and which yield cured polymers possessing outstanding physical properties.

Of particular interest are the polyesters prepared from adipic acid and a mixture of glycols containing approximately 80 mol percent of ethylene glycol and 20 mol percent of propylene glycol in the molecular weight range of approximately 2000 and having an acid number not greater than 2.

The polymeric polyether polyols such as polypropylene ether glycol or polytetramethylene ether glycols having molecular weights of about 1500 to 3500 may be used in place of the polyesters for making the pourable polyurethane repairs of this invention, although it should be appreciated that the polyether urethanes usually do not have as much tear resistance and as high a tensile strength properties as the corresponding polyester urethanes.

As is well recognized in the production of polyurethane products, an excess of diisocyante is generally employed to insure the cure of the polyester and to provide sufficient points of reaction with other ingredients containing reactive hydrogen such as ortho dichlorobenzidine or methylene-bis-ortho-chloroaniline.

Any of a wide variety of organic diisocyanates may be employed to prepare the polymers of this invention including aromatic, aliphatic and cycloaliphatic diisocyanates and mixtures of two or more of these. Representative compounds include the meta tolylene diisocyanates such as 2,4-tolylene diisocyanate and 2,6-tolylene diisocyanate; n-phenylene dissocyanate; 4,4'-diphenylene diisocyanate; 4,4'-diphenylene methane diisocyanate; 1,5-naphthylene diisocyanate; dianisidine diisocyanate; 4,4'-tolidine diisocyanate; 4,4'-diphenyl ether diisocyanate; 1,4-tetramethylene diisocyanate; 1,6-hexamethylene diisocyanate; 1,10-decamethylene dissocyanate; 1,4-cyclohexylene diisocyanate; 4,4' - methylene-bis-(cyclohexyl isocyanate) and 1,5-tetrahydronaphthylene diisocyanate. Of these the aromatic isocyanates and particularly the tolylene diisocyanates, 4,4'-tolidine diisocyanate and 4,4'-diphenylene methane diisocyanate are preferred. The diisocyanates may contain other substituents such as alkyl or halogen but should contain no groups such as hydroxyl or amino groups which are reactive with the isocyanate radicals.

Suitable crosslinkers are the class of chemical compounds known as diamines, glycols and amino alcohols. The specific nature of these crosslinkers is known and described in the literature. The specific diamines that are preferred for making cast polyurethane are the chloro diamines as these materials yield a reaction mixture which has sufficient pot life to permit liquid castings to be made without having to resort to special operating conditions.

A particularly effective formulation from the standpoint of the physical properties of the cured "product" and the physical nature of the liquid mixture is one containing approximately 100 parts by weight of a polyester having an average molecular weight of approximately 2,000, approximately 6 parts by weight of ortho dichlorobenzidine and approximately 23 parts by weight of 3,3'-dimethyl 4,4'-diphenylene dissocyanate. Methylene-bis-ortho chloroaniline also can be used instead of ortho dichlorobenzidine with the above recipe to make pourable repairs.

The pourable polyurethane reaction product of this invention is prepared by heating the polyester or a polytetramethylene ther glycol to a temperature of from 100° C. to about 120° C. The polyol is then put under a vacuum for approximately one hour to degas. Diisocyanate and 0.03 part of a catalyst such as trialkyl amine is then added, followed by a thorough mixing or blending of the reactants for from 30 to 45 minutes under a vacuum. A crosslinker such as a diamine is added, followed by a thorough blending of this reactant into the mixture for approximately one minute and by pouring the complete reaction mixture into the repair area. While the reaction mixture will set up without the application of additional heat, it has been found expedient to place the tire carcass into a heated air oven or to heat the tire by some other means, as for instance in a split mold, such as is shown in FIG. 4 in order to accelerate the rate of cure of the reaction mixture. The application of pressure during the oven curing operation has been found not to be necessary or required. However, the application of pressure to products cured in a press has been found to produce beneficial results in that a closer contour can be maintained.

The invention is further illustrated but not limited by the following examples, where the parts and percentages are by weight unless otherwise indicated.

*Example 1*

A polyester (100 parts) prepared from adipic acid and a mixture of glycols containing 80 mol percent of ethylene glycol and 20 mol percent of propylene glycol and having an average molecular weight of approximately 2000 and a hydroxyl number of approximately 57 and an acid number of 0.8 can be heated at 120° C. for one hour under a vacuum of 20 millimeters of mercury. To this polyester 23 parts by weight of 3,3'-dimethyl-4,4'-diphenylene diisocyanate is added. The mixture is then stirred for 30 minutes at 120° C. under a vacuum of 20 millimeters of mercury. Ortho dichlorobenzidine (6 parts by weight) is then added and mixed with the polyester and diisocyanate for one minute, after which the complete reaction mixture can be poured into a tire repair cavity.

*Example 2*

A mol of polytetramethylene ether glycol of about 1800 molecular weight can be reacted under the conditions of Example 1 with about 1.8 mols of 4,4'-diphenylene methane diisocyanate to form a prepolymer, then about 0.8 mol of methylene bis-ortho chloroaniline can be added as a reticulator. The above formulation forms a mixture with a short pot life and will set under ordinary temperatures into a tough resilient rubber-like composition.

The examples of polyurethane set forth above are typical compositions that are considered desirable for pouring a tire repair. Since the polyurethane compositions selected for pouring a tire repair will be exposed to high temperature operation it is important that such compounds possess good heat resistance. One indication of the ability of a polyurethane to withstand heat is the temperature at which the polymer begins to soften or smear. The smear point determinations were conducted in accordance with the test procedure outlined in an article by S. D. Gehman et al., in Rubber Chemistry and Technology, vol. XXVIII, No. 2, April–June 1955. The formulation of Example 1 resulted in a smear point of 410° F. When the constituents of Example 2 were tested a smear point of 374° F. resulted. The high smear point values are indicative of a polyurethane that will also provide good wearing and abrasion characteristics.

Other physical properties of a desirable polyurethane are the hardness and tensile strength. The rubber of a pourable repair element should have a Shore A hardness of at least 60 and preferably in the range of 75–95 when at 75° F. The tensile strength should be preferably 3500 to 5500 pounds per square inch.

As has been pointed out before, the pourable polyurethan adheres quite well to the cord material within the tire carcass. The bond thus achieved is believed to be the first time that broken tire cord threads have been successfully reunited from a stress standpoint. In order to better fix the adhesion between the cured rubber compound in the tire carcass and the pourable polyurethane repair mixture, the exposed surfaces of the rupture are coated with a typical adhesive cement such as one formed from an aromatic amine such as aniline coupled with an aldehyde such as formaldehyde and a rosin oil. Other adhesives that will provide good bonding between the polyurethane and rubber tire are resins such as the 1,2-polyepoxides which are obtained by the reaction of phenolic compounds with epichlorohydrin in the presence of a base, and the polyisocyanates which are obtained by the phosgenation of polyamines resulting from, for example, the condensation of an aromatic amine such as toluidine with an aldehyde such as benzaldehyde. An additional step that insures better bonding between the tire carcass and the polyurethane is subjecting the tire to a heat soak prior to pouring the repair. A few hours soak time at 200–250° F. will drive out any diffused gases which invariably become associated with a rubber compound and tire cords.

While certain representative embodiments and details have been shown for the purpose of illustrating the invention, it will be apparent to those skilled in this art that various changes and modifications may be made therein without departing from the spirit or scope of the invention.

I claim:
1. The method of repairing a ruptured area in a pneumatic tire including the steps of:
   (1) preparing the ruptured area of the tire so that a clean rubber surface is produced and exposing the ends of the cord reinforcement so that they are free of rubber for a substantial distance along their respective lengths,
   (2) heating the tire in order to expel any gas and moisture in the rubber and cord reinforcement immediately adjacent the repair area,
   (3) coating the rubber surface of the ruptured area with a bonding agent selected from the class consisting of resinous 1,2-polyepoxides, the reaction product of an aromatic amine and an aldehyde, and polyisocyanates formed by the phosgenation of the condensation product of an aromatic amine and an aldehyde,
   (4) pouring a polyurethane liquid reaction mixture into the ruptured area thus contacting the rubber surface and encapsulating the exposed end lengths of the cord reinforcement, said reaction mixture prepared from the combination of a degassed polyester polyol having an acid number not greater than 5 and an organic diisocyanate, the combination cross-linked by means of a diamine, and
   (5) setting and curing the poured mixture at room temperature to produce a solid patch that will permit the cord reinforcement to carry a load across the once ruptured area.

2. A repaired pneumatic tire constructed with a cord reinforced carcass and a vulcanizable elastomer, an irregular shaped cavity extending into the carcass, the cords in said cavity being elastomer-free and in intimate contact with a polyurethane patch, that has been formulated from a liquid reaction material prepared from the combination of (1) a degassed polyester polyol having an acid number not greater than 5, and (2) an organic diisocyanate, the combination of (1) and (2) being cross-linked by means of a diamine, said polyurethane patch positioned co-extensive with the walls of said cavity, the elastomer-free reinforcement cords of the carcass extending into the polyurethane patch material an appreciable extent whereby the reinforcement cords are capable of carrying a substantial tensile load across the patch area.

3. A pneumatic tire containing a patch as claimed in claim 2 wherein the cured polyurethane material has a smear point between 200° F. and 410° F. and a Shore A hardness at 75° F. of at least 60 and a tensile strength of at least 2,000 pounds per square inch.

4. A pneumatic tire containing a patch as claimed in claim 2 wherein the cured polyurethane contains a flocked filamentary material.

References Cited by the Examiner

UNITED STATES PATENTS

| | | | |
|---|---|---|---|
| 2,620,852 | 12/52 | Forbush | 156—97 X |
| 2,837,767 | 6/58 | Macdonald | 156—97 X |
| 2,873,790 | 2/59 | Cadwell et al. | |
| 2,905,582 | 9/59 | Coleman et al. | |
| 2,948,691 | 8/60 | Windemuth et al. | |
| 2,953,489 | 9/60 | Young. | |
| 3,007,831 | 10/61 | Keenan. | |
| 3,019,148 | 1/62 | Hausch. | |
| 3,042,545 | 7/62 | Kienle et al. | |

OTHER REFERENCES

Dumbrow, B. A.: Polyurethanes, N.Y., Reinhold Pub. Corp., 1957, pp. 116–123. QD 305.A2 D6.

EARL M. BERGERT, *Primary Examiner.*